(12) United States Patent
Dieziger

(10) Patent No.: US 8,998,557 B2
(45) Date of Patent: Apr. 7, 2015

(54) PICKUP TRUCK LOADING SYSTEM

(71) Applicant: David Douglas Dieziger, Missoula, MT (US)

(72) Inventor: David Douglas Dieziger, Missoula, MT (US)

( * ) Notice: Subject to any disclaimer, the term of this patent is extended or adjusted under 35 U.S.C. 154(b) by 189 days.

(21) Appl. No.: 13/801,342

(22) Filed: Mar. 13, 2013

(65) Prior Publication Data
US 2014/0271070 A1    Sep. 18, 2014

(51) Int. Cl.
*B60P 1/62* (2006.01)
*B60P 3/32* (2006.01)

(52) U.S. Cl.
CPC ........................................ *B60P 3/32* (2013.01)

(58) Field of Classification Search
CPC ......... B60P 3/32; B60P 1/6427; B60P 1/6454
USPC .................. 414/392, 400, 500, 462, 549, 498
See application file for complete search history.

(56) References Cited

U.S. PATENT DOCUMENTS

| | | | | |
|---|---|---|---|---|
| 3,190,480 A | * | 6/1965 | Maynez | 254/49 |
| 3,243,161 A | * | 3/1966 | Green | 254/45 |
| 3,248,083 A | * | 4/1966 | De Gennaro et al. | 254/47 |
| 3,360,141 A | * | 12/1967 | Martin | 414/572 |
| 3,411,646 A | * | 11/1968 | Emery et al. | 414/500 |
| 3,532,236 A | * | 10/1970 | Hostetler | 414/498 |
| 3,684,112 A | * | 8/1972 | Wijers | 414/500 |
| 3,695,472 A | * | 10/1972 | Rasmussen | 414/500 |
| 3,715,100 A | * | 2/1973 | Spencer | 254/49 |
| 3,738,517 A | * | 6/1973 | Luse | 414/498 |
| 3,743,125 A | * | 7/1973 | Ashley, Jr. | 414/498 |
| 3,836,030 A | | 9/1974 | Timmons | |
| 3,894,643 A | * | 7/1975 | Wilson | 414/462 |
| 5,269,642 A | | 12/1993 | Zoromski | |
| 6,582,176 B1 | * | 6/2003 | Lehner | 414/498 |
| 8,534,978 B2 | * | 9/2013 | Dieziger | 414/500 |
| 2003/0194304 A1 | * | 10/2003 | Davis et al. | 414/498 |
| 2011/0110753 A1 | | 5/2011 | Dieziger | |

OTHER PUBLICATIONS

U.S. Appl. No. 13/277,389, Dieziger, not published.

* cited by examiner

*Primary Examiner* — Kaitlin Joerger
(74) *Attorney, Agent, or Firm* — Lawrence Lambelet

(57) ABSTRACT

An apparatus for loading a camper-insert, or other large-volume load, onto the bed of a pickup truck comprises a stiff-leg frame for supporting the load from the ground, the frame preventing the load from applying weight to the tail end of the bed with damaging consequences while the load is being cantilevered into position over the frame by the draw of a winch and cable system. The apparatus uses at least one telescoping leg to lift the rear of the load as part of a novel hoist assembly, which dynamically braces the telescoping leg on a foot while providing minimal interference to nesting the camper-insert closely to the host surfaces.

18 Claims, 6 Drawing Sheets

PICKUP TRUCK LOADING SYSTEM

This is a U.S. Non-Provisional application.

FIELD OF THE INVENTION

This invention relates to loading devices for trucks, and more particularly to a loading device for a camper insert or other large volume load.

BACKGROUND OF THE INVENTION

Loading a truck bed, such as on a pickup truck, sometimes involves heavy or unwieldy lifting in a situation where mechanized equipment is unavailable for the task. Such a situation might occur in a home or field environment. Such a case can be made for snowmobiles, four-wheeled recreational vehicles, boats, game carcasses, or camper-inserts, to name a few objects which are too large or too heavy for manual manipulation. Another case can be made for aggregated loads, such as firewood, shingle bundles, building blocks, or soil, fertilizer, or salt in bags, where lifting individual pieces one-at-a-time would be inefficient. In all cases, it is useful to stage the load at ground level and use a portable device to lift and transfer the load onto the truck bed.

A winch and cable system powered by a battery comprises an easily portable device to drag a load onto a truck bed. In U.S. Pat. No. 5,232,329 to Livingston, a snowmobile loaded onto a ground-level pallet is lifted by a winch at the end of a boom. The boom doubles as a platform which can be raised to lift the load and then lowered by hydraulic means to receive the load at an appropriate incline. The loaded platform is then further lowered into the truck bed. The platform and associated hydraulics, however, must be installed in the truck, rendering the bed thereby unusable for other purposes.

In U.S. Pat. No. 3,894,643 to Wilson, a boat is hoisted onto the rear of a pickup truck by means of a winch tugging against a pair of articulating brace members, said members braced against both the rear of the truck and the ground to scissor the load thereby upwardly. During the lift, however, the forces of the weight of the boat and the downward pull of the winch cable are collectively applied to the tail, or rearward-most part, of the vehicle. At the tail, in such an extreme position, the forces are applied against the suspension and the frame with damaging leverage. Additionally, lateral forces from the brace members and from the winch act at different elevations on the truck, thereby creating a force couple on the truck and the attached scaffolding, which would add stress to the truck and cost in overdesigned structure.

In U.S. Pat. No. 5,269,642 to Zoromski, a camper-insert with an integrated structure comprising a winch and cable system is elevated at one end to be partially supported by stiff legs. As the load is winched farther onto the stiff legs, the center of gravity shifts to tilt the structure against the tail of the pickup truck bed. Further movement pivots the load over the tail and into the bed while simultaneously lifting the stiff legs. In spite of the temporary supporting role of the stiff legs, they are ultimately rendered ineffective in preventing weight from being applied to the tail in a potentially damaging way. Furthermore, the structural elements for the pivot are integrated into the load and cause the camper to sit high in the bed. Lastly, the winch cables are dragged over the lower front chine of the camper and along the bottom creating both frictional resistance and wear on both the camper and the cables.

The present invention provides novel solutions for loading a truck bed without the need to for structure permanently installed in the bed, without using the tail of the bed as a fulcrum edge, and in a way that minimizes any offsetting structure so that the load rides as nearly flush to the bed as possible.

SUMMARY OF THE INVENTION

It is desirable, particularly in the case of a camper-insert or other large-volume load, to have the load nest as closely and as far forward as possible to the truck body. Intervening structures that tend to lift the load, or offset it rearwardly, elevate the center of gravity, change the tipping dynamics of the loaded vehicle, and place additional stresses on the suspension system. Therefore, the ideal loading apparatus should place as little as possible of the apparatus underneath the load on the truck bed. It is further desirable to have the apparatus capable of, and available to, opportunistically unload the truck. In short, the apparatus should travel in a disassembled configuration with the load. It is further desirable to avoid dynamically loading the tail end of the vehicle where leverage upon the suspension system can be damagingly applied. It is further desirable, for resale purposes, to make as few modifications to the camper-insert as possible.

Because a camper-insert, or other large-volume load, typically has a length equal to, or greater than, the truck bed, the center of gravity of the load is thereby positioned rearwardly to such an extent that a very large pulling force is needed to cantilever the load over an elevated tipping point. Such a large force would have to be countered by the vehicle holding position under brake power and fraction, again applying stresses to the to vehicle's systems. By sequentially lifting the rear of the load, however, the force vectors can be kept more nearly horizontal and the extremes of the moment-arm forces thereby avoided. Therefore, it is desirable to lift the rear of such a load with a rotating beam based against a foot positioned forwardly on the ground and braced directly against the structure applying the force.

It is accordingly an object of the present invention to use a stiff-leg structure bearing on the ground, and not on the truck, to lift and transport there over a camper-insert, or other large-volume load, until a gravity shift positions the load well into the bed. It is a further object to use a winch and cable system as a means for drawing the load forward. It is a further object to lift the rear of the load by swinging it over at least one telescopic beam pivoting on a ground-based foot placed intermediately between the stiff-leg structure and the rear. It is a further object to use triangular geometry for at least two telescopic beams to avoid diagonal bracing of the beams and more than a singular foot. It is a further object to brace the ground-based foot against the stiff-leg structure by using similar triangular geometry. It is a further object to move the similar triangular geometry in a pivot upon the foot from a ground position to an elevated tipping position, avoiding thereby a force couple applied to the stiff-leg structure. It is a further object to use another winch and cable system to withdraw the load from the truck bed and return it to the ground. It is a further object to cooperatively link the two winches to apply braking force for the descent of the load. It is a further object to remove all structure beneath and in front of the load, except that necessitated by certain clearances, so that the load rides as closely nested as possible. It is a further object to provide at least one wheel extending rearwardly from the camper-insert to facilitate movement of the load over the ground. It is a further object to allow the truck bed to move independently from the stiff-leg structure while recoiling from the deposit and withdrawal of the load burden. It is a further object to use rope, instead of wire cable, for the winch and cable systems to avoid safety hazards attendant to flexing wire. It is a further object to make the loading and unloading apparatuses portable with the load. It is a further object to hold down the load with a lief spring which allows the truck body to twist independently of load.

These objects, and others to become hereinafter apparent, are embodied in an apparatus for loading a camper-insert onto a truck having a bed with an open end, comprising a stiff-leg frame for lifting and supporting the camper-insert from a ground surface immediately adjacent the open end. The stiff-leg frame is comprised of at least two vertical members joined substantially at the proximal ends thereof by a crossbar member while the distal ends thereof rest upon the ground surface. The crossbar member is positioned at substantially the elevation of the bed. The stiff-leg frame is horizontally stabilized by at least one connector hinge attached between the stiff-leg frame and the open end. The apparatus is further comprised of a foot resting on the ground surface medially beneath the camper-insert when the camper-insert is in position for loading at the back of the truck. The foot is braced against the stiff-leg frame. The apparatus is further comprised of at least one telescoping beam pivotally connected at its distal end to the rear of the camper-insert and pivotally connected at its proximal end to the foot. The telescoping beam swings in a vertical arc about its proximal end and collapses to a minimum radius of curvature equal to the height of the crossbar. The minimum radius of curvature occurs when the center of gravity of the load shifts forward of the stiff-leg frame. Lastly, the apparatus comprises a means for drawing the camper-insert over the frame and into the bed. Functionally, the front and rear of the camper-insert are sequentially lifted up and over the stiff-leg frame by the means for drawing and the at least one telescoping beam braced against the stiff-leg frame. Further, the weight of the camper-insert is substantially supported by the stiff-leg frame and not by the open end. Further, the horizontal thrust from cantilevering the camper-insert over the frame is transferred to the truck through the at least one connector hinge. Lastly, the camper-insert settles onto the truck bed with minimal offset to mating surfaces.

In the preferred embodiment, the means for drawing comprises a first winch and cable system. The foot is braced by two struts in a V configuration with the vertex located at the foot. The at least one telescoping beam, in this case, is two telescoping beams in a V-configuration with the vertex located at the foot. The first winch and cable system comprises a first winch fixed to the stiff-leg frame. The first winch winds a first cable to effectively draw the camper-insert forward from a rear attachment point.

In a particular preferred embodiment, the apparatus further comprises a hoist assembly. The hoist assembly includes the two struts and the two telescoping beams, the struts and beams hingingly attached at distal ends thereof to the foot. The hoist assembly is configured to raise the front of the camper and position proximal ends of the two struts substantially at the elevation of the cross bar when lifted by the first winch and cable system. The hoist assembly is capable of partial disassembly for stowage and transport purposes.

In another particularity, the apparatus further comprises a means for withdrawing the camper-insert over the stiff-leg frame and out of the bed. The means for withdrawing the camper-insert comprises a second winch and cable system. The second winch and cable system comprises a second winch fixed to the stiff-leg frame. The second winch winds a second cable to effectively draw the camper-insert rearward from a front attachment point.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein:

FIG. 12 is the detail view of FIG. 11 showing the lief spring zoomed in;

DETAILED DESCRIPTION OF THE PREFERRED EMBODIMENT

Figure 1:
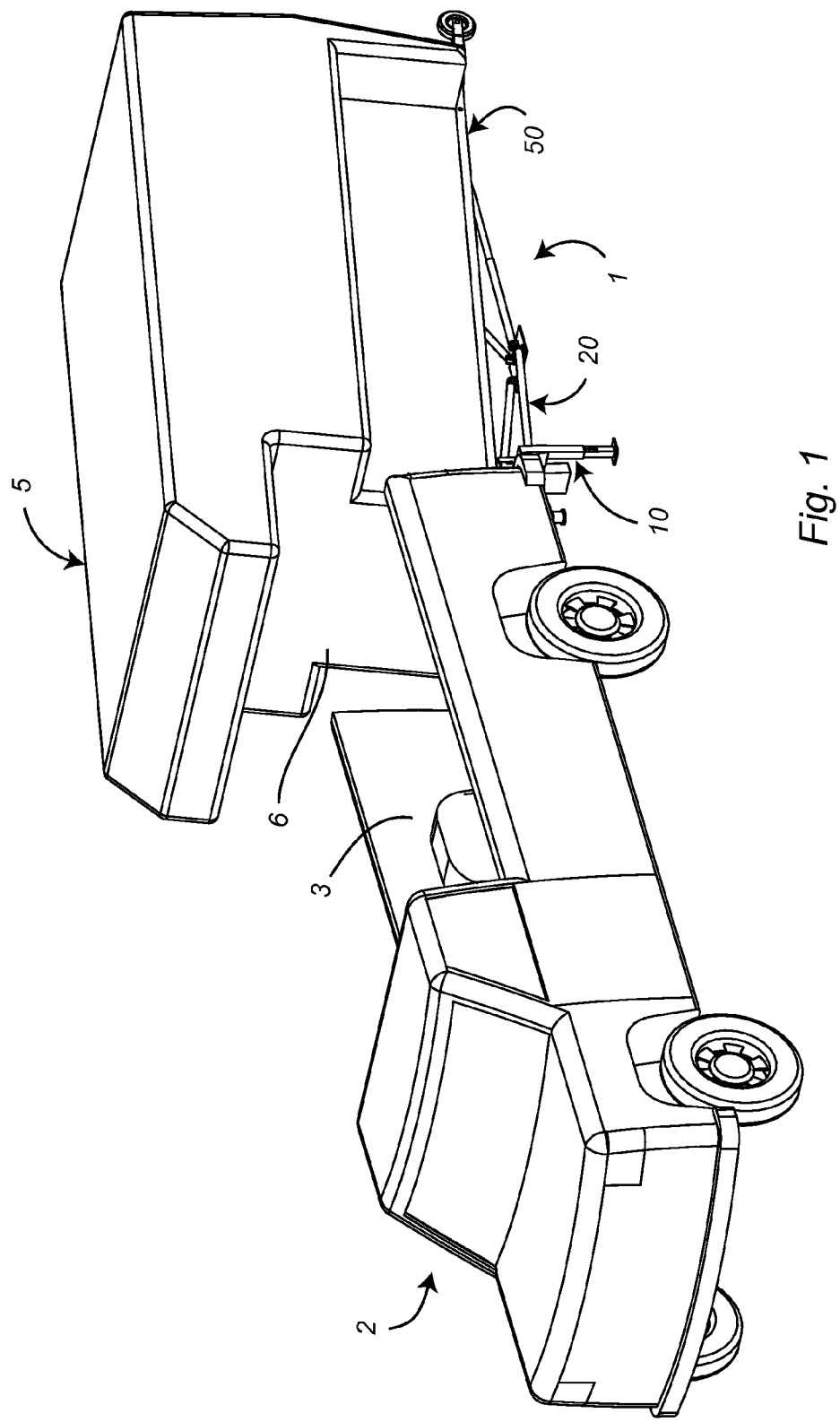
FIG. 1 is a perspective view of the apparatus of the present invention in position with the truck and with the load partially raised.
Figure 5:
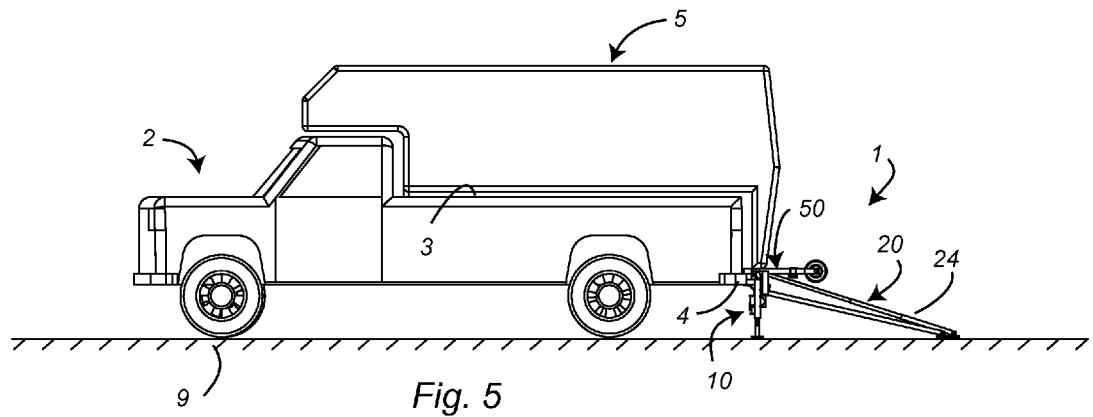
FIG. 5 is an elevation view of the apparatus at the end of the loading sequence with the load in place in the truck bed.
Figure 6:
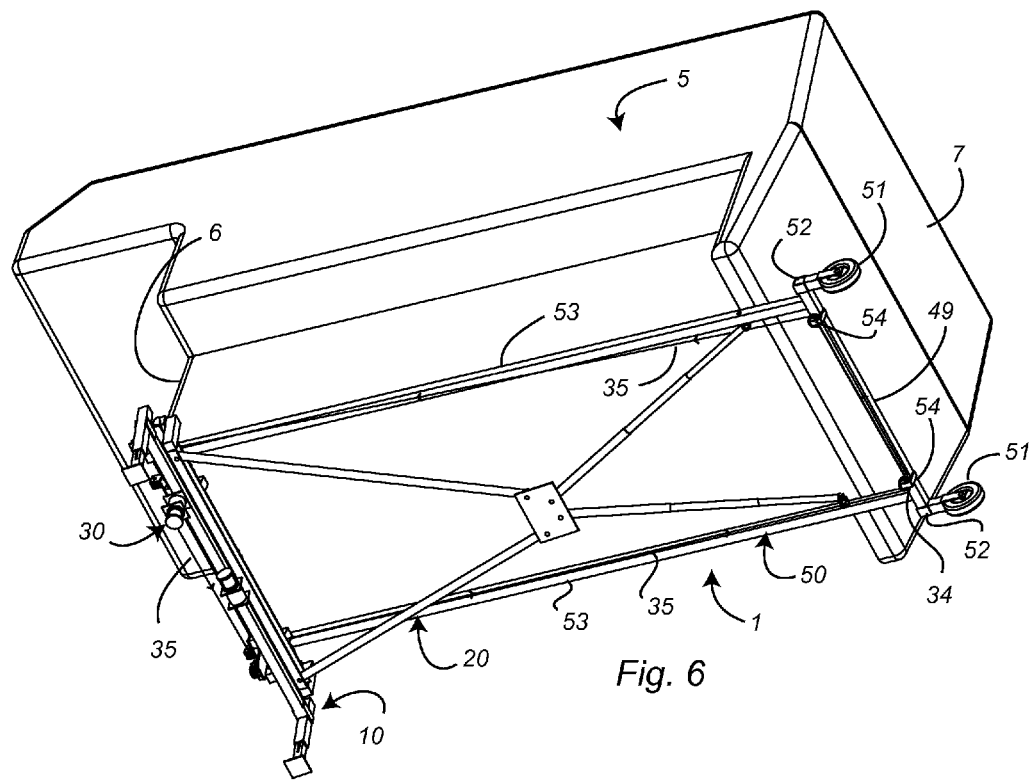
FIG. 6 is a perspective view of the bottom of the camper-insert with the platform and hoist assembly showing.

The component systems for an apparatus for loading 1 are best shown in FIGS. 5 and 6. In the preferred embodiment, a camper-insert 5 supported on a pallet 50 is loaded onto a truck 2 assisted by a stiff-leg frame 10, a hoist assembly 20 and a means for drawing 30 the camper-insert 5 onto a bed 3 of the truck 2 (FIG. 1). In an alternate embodiment of the apparatus 1, any large-volume load 8 (not shown) can be loaded with the same system components.

Figure 2:
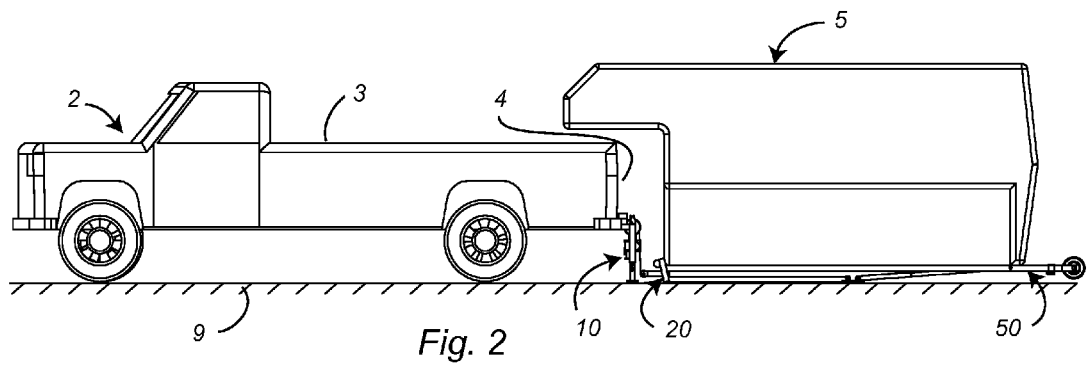
FIG. 2 is an elevation view of the apparatus at the beginning of the loading sequence with the load on the ground.

In the progression sequence of FIGS. 2-5, several stages of the loading process are illustrated. In FIG. 2, the camper-insert 5 is resting on a ground surface 9 in a ready position supported by the pallet 50 and the hoist assembly 20. The stiff-leg frame 10 is hingeably attached to the open end 4 of the bed 3 by connector hinge 15 (FIG. 13).

Figure 3:
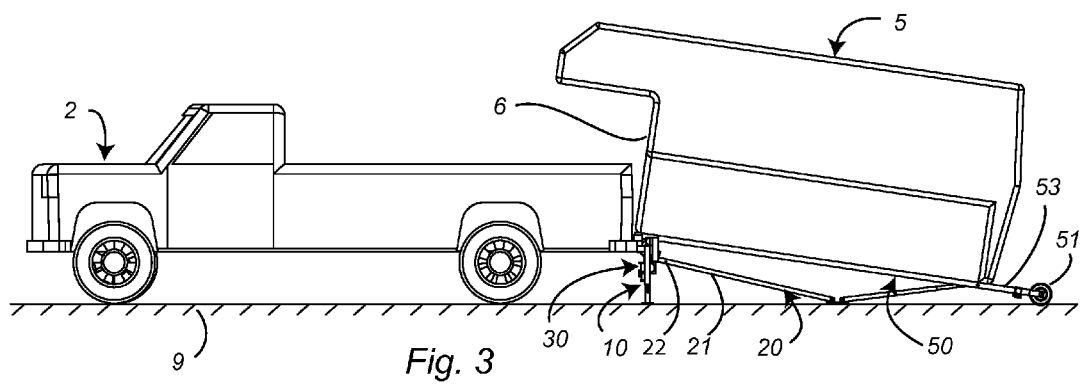
FIG. 3 is an elevation view of the apparatus with the front end of the load raised by the hoist assembly.
Figure 13:
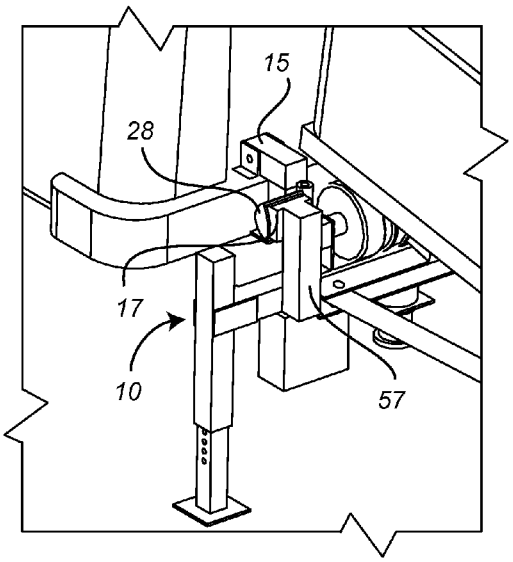
FIG. 13 is a partial perspective view the open end of the truck showing the connector hinge and the mating sockets.

In FIG. 3, the hoist assembly 20 is raised by the means for drawing 30 to interposition a male socket 28 of the hoist assembly 20 with a female socket 17 of the stiff-leg frame 10 (FIG. 13). In this interposition, proximal ends 22 of struts 21 of the hoist assembly 20 are approximately in line with the means for drawing 30. As a consequence, forces relating to bracing and drawing are essentially co-planar, and no couple force is set up. At the same time, the front 6 of camper-insert 5 is raised to clear the stiff-leg frame 10. The camper-insert 5 is advanced over the ground surface 9 by wheels 51 peripherally attached to extended side rails 53 of the pallet 50.

Figure 4:
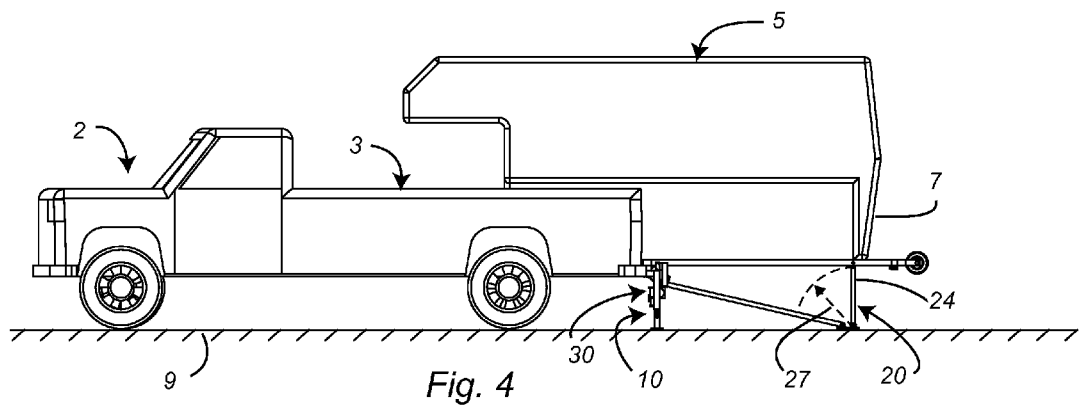
FIG. 4 is an elevation view of the apparatus with the rear end of the load raised by the telescoping beams.

In FIG. 4, the means for drawing 30 has collapsed telescoping beams 24 to a minimum radius of curvature 27, where upon continued drawing raises the rear 7 of the camper-insert 5 to a position essentially level with the floor of the bed 3. The telescoping beams 24 pivot over a foot 29 bearing upon the ground surface 9, which is braced by the struts 21 through a linkage of male socket 28, female socket 17 and connector hinge 15 to the truck 2. At this point, the center of gravity (not shown) of the load is balanced such that continued forward movement is there after achieved on a level.

In FIG. 5, the camper-insert 5 has been advanced into its nesting position in the bed 3. The telescoping beams 24, no longer bearing weight, have extended to follow the pallet 50 onto the bed 3. In the transition from ground to bed, the weight burden of the camper-insert 5 shifted from the stiff-leg frame 10 to a lateral point on the bed 3 roughly equivalent to the rearward offset of the center of gravity, and, at no time, did the burden bear on the open end 4.

Figure 9:
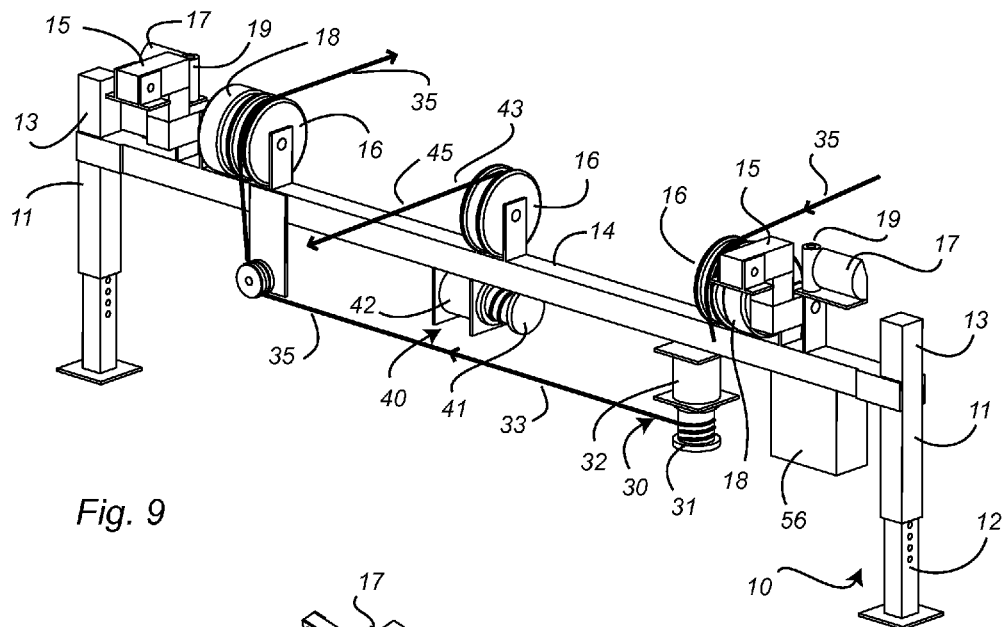
FIG. 9 is a perspective view of the stiff-leg frame showing the cabling.

Referring to FIG. 9, the stiff-leg frame 10 is comprised of two vertical members 11 having distal ends 12 bearing on the ground surface 9. The distal ends 12 may be made to be telescoping and adjustable by inserting pins. The vertical members 11 are spread apart roughly the width of the bed 3 and are joined by crossbar 14 at proximal ends 13 thereof to form a scaffold-like structure. Two rollers 18 are mounted on crossbar 14 in flanking positions to rotationally receive the side rails 53 of pallet 50. The rollers 18, in their level placement with the bed 3, are defining for the height of the crossbar 14. Two side guide rollers 19, axially-mounted perpendicular to the crossbar, are placed just outboard of the rollers 18 to keep the load centered when transported there over. The two connector hinges 15 and the two female sockets 17 are also mounted in outboard positions. The two connector hinges 15 allow articulation of the bed 3 up and down, thereby to buffer the stiff-leg frame 10 from the reflex of the truck's suspension when burden is applied or lifted, while forming a rigid lateral bridge to withstand forward thrust during loading. The two female sockets 17 receive the male sockets 28 of the hoist assembly 20 and position the hoist assembly appropriately with respect to the stiff-leg frame 10.

The means for drawing 30 and the means for withdrawing 40 are both operationally based at the crossbar 14. In alternate embodiments, the means for drawing and withdrawing might be a reversible screw-threaded rod or a hand-crank. In the preferred embodiment, the means for drawing 30 is a first winch and cable system 31 and the means for withdrawing 40 is a second winch and cable system 41. Both a first winch 32 of the first winch and cable system 31 and a second winch 42 of the second winch and cable system 41 are suspended beneath the crossbar 14. The first winch 32 winds a first cable 33, on an integral drum, following a first cable circuit 35, as shown among FIGS. 6, 9 and 10. The first cable circuit 35 passes at all turning points over sheaves 16 on the stiff-leg frame 10, sheaves 59 on the hoist assembly 20 and sheaves 54 on the pallet 50. The orientation of the first winch 32 and the first cable circuit 35 is such as to draw, in the winding mode, a rear attachment point 34 proximate the rear 7 of the camper-insert 5 forwardly. In the preferred embodiment, the first cable circuit doubles back to the crossbar 14 to give a two-to-one purchase, as shown; therefore, all sheaves on the first cable circuit are paired. Other configurations for applying mechanical leverage, such as, for example, a running block, are also comprehended by this invention. A second first winch 32 may be used in parallel to provide redundancy and additional power.

In the preferred embodiment, the first winch 32 and the second winch 42 are electric motor driven. The electric motors may be powered by the truck's battery system and controlled through a control box 56. Control box 56 may alternatively be another battery, or a combined battery and control installation.

Figure 10:
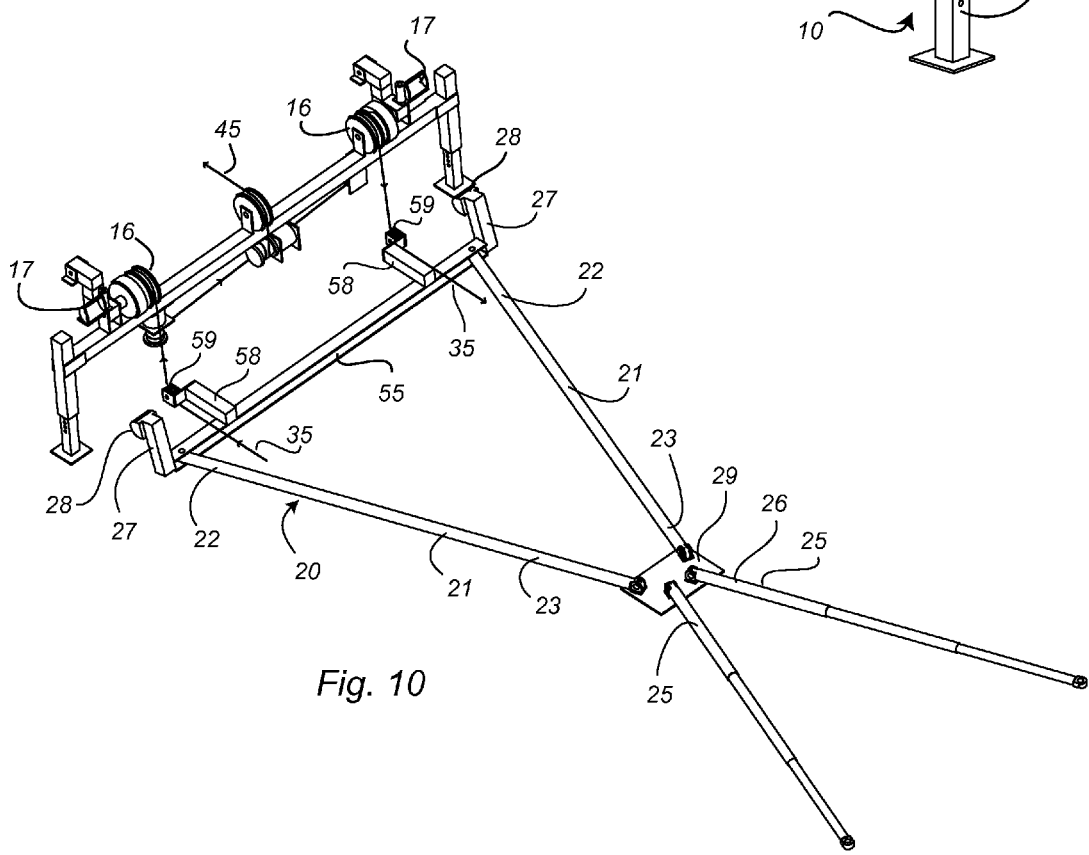
FIG. 10 is a perspective view of the hoist assembly showing the cabling.

The second winch 42 winds a second cable 43 in a second cable circuit 45, as shown in FIGS. 9 and 10. Second cable circuit 45 passes over another sheave 16 and connects to a front 6 of the camper-insert at a front attachment point 44 (not shown). The orientation of the second winch 42 and the second cable circuit 45, essentially reversing the former's direction, is such as to draw the front 6 rearwardly in winding mode. When the second winch 42 is in winding mode, the first winch 32 is in unwinding mode, and visa versa. When the first winch 32 is unwinding, it free-wheels until the tipping point, where the center of gravity of the load shifts rearwardly of the stiff-leg frame 10. Thereafter, the first winch 32 engages to provide a braking force for the gravity takeover of the load. The manner and method of this braking force for two winches acting in cooperation is fully disclosed in U.S. Patent Application Publication 2011/0110753, which is incorporated in entirety herein by reference.

Referring to FIG. 10, the hoist assembly 20 is comprised of the struts 21, the at least one telescoping beam 25, the foot 29 and a spreader bar 55. In the preferred embodiment, the at least one telescoping beam 25 is two telescoping beams 25 in a V-configuration with the vertex based on the foot 29. The use of a V-, or triangular, configuration, as opposed to a rectangular one, for example, avoids the sway bracing necessary to keep the rectangular arms square. It also allows a singular foot to be used. Since the weighted foot 29 will necessarily be dragged with strong frictional resistance over the ground surface in the manipulation of the hoist assembly 20, it is important to keep the contact area to a minimum. Each telescoping beam 25 is hingingly and rotationally, on orthogonal axes, attached to the foot 29 at a distal end 26 thereof, and hingingly and rotationally attached to the rearward part of the corresponding side rail 53. Each telescoping beam 25 swings in a vertical arc over the distal end 26 to lift the camper-insert 5. Each telescoping beam 25 collapses to a minimal radius of curvature 27 (FIG. 4) and extends to accommodate the full range of position from load-on-the-ground to load-in-the-bed. The minimal radius of curvature 27 represents the zenith of the swing when the rear 7 reaches the elevation of the bed 3.

The two struts 21 brace the foot 29 against the truck 2, as described above, and also form a V-configuration with the vertex positioned at the foot 29. Each strut 21 is hingingly attached to the foot 29 at its distal end 23 and attached at the proximal end 22 in a flanking position to the spreader bar 57. The spreader bar 57 spans the distance between the female sockets 17. The male socket 28 is located at each end of the spreader bar 57 and offset there from by riser stub 57. The sheaves 59 on the hoist assembly 20 corresponding to the sheaves 16 on the stiff-leg frame 10 are also offset from the spreader bar 57 by extender stubs 58. The extender stubs 58 are positioned inboard of the stiff-leg frame sheaves 16, and the hoist assembly sheaves 59 are offset bi-laterally there from to align with the first cable circuit 35. The lengths of the riser stubs 57 and the extender stubs 58 and all offsets are configured to place the sheaves 59 in the forward shadow of the sheaves 16.

Starting from a position on the ground, the sheaves 59, and the strut-end of the hoist assembly, are lifted by the first winch 32 operating in winding mode through the threading connection of the first cable circuit 35 to first mount and then pass over the sheaves 16. The male sockets 28 are received in the female sockets 17 when the juxtaposition of the sheave pairs takes place. When the sockets become locked in the receiving position, the forward advancement of the hoist assembly 20 ceases and the struts 21 are elevated to brace against the stiff-leg frame 10, and by linkage to the truck 2, at a position which places the proximal ends 22 essentially co-planar with the draw of the winch. If the struts 21 were left to brace against the stiff-leg frame 10 from a ground position, or any other position in between, a force couple would have been set up to topple the stiff-leg frame. It should be noted that if the sheaves 59 were not located, as they are, on the rising hoist assembly 20, they would necessarily have been located in a forward position on the camper or pallet where they would have added to the load offset. Where they are presently, in the shadow of the stiff-leg frame, they are out of the way and ready to be used again during unloading.

Figure 14:
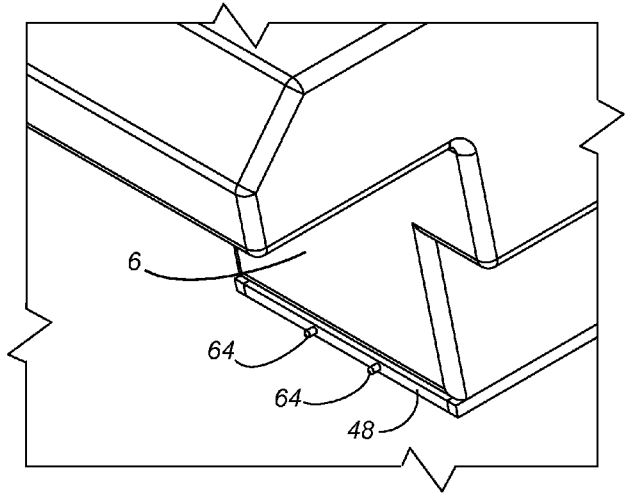
FIG. 14 is a partial perspective view of the platform under the camper-insert showing the bosses that connect with the lief spring.

Referring to FIG. 6, the pallet 50 is comprised of the parallel side rails 53, which extend rearwardly from the rear 7 of the camper-insert 5. Ideally, the extent of the side rails 53 is sufficient to make an angle of inclination with the ground surface 9 of 20 degrees or less. The side rails 53 are mounted beneath the camper on the periphery edges thereof and provide the slipping surfaces for the load. The side rails 53 are boxed in on the front by head rail 48 (FIG. 14) and on the rear by tail rail 49. Tail rail 49 extends beyond the side rails 53 on each side to receive the wheels 51. Wheels 51 are mounted on collars 52. Tail rail 49 is square in shape, and collars 52 have corresponding square apertures therein to enable the wheels 51 to be dismounted and rotated ninety degrees. Zero degrees is for loading while ninety degrees is for travel (FIG. 8), or otherwise for boosting elevation. The sheaves 54 are attached to the tail rail 49 and define the rear attachment point 34. The sheaves 54 are laterally positioned to feed in a direct line with the sheaves 59; otherwise, the first cable 33 would jump the sheave groove.

Figure 7:
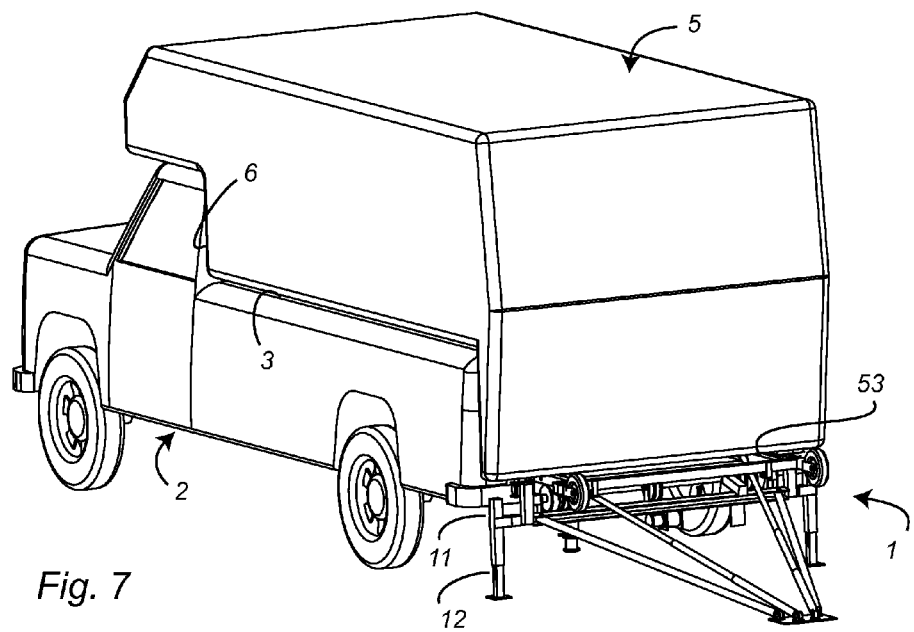
FIG. 7 is the perspective view of FIG. 5.
Figure 8:
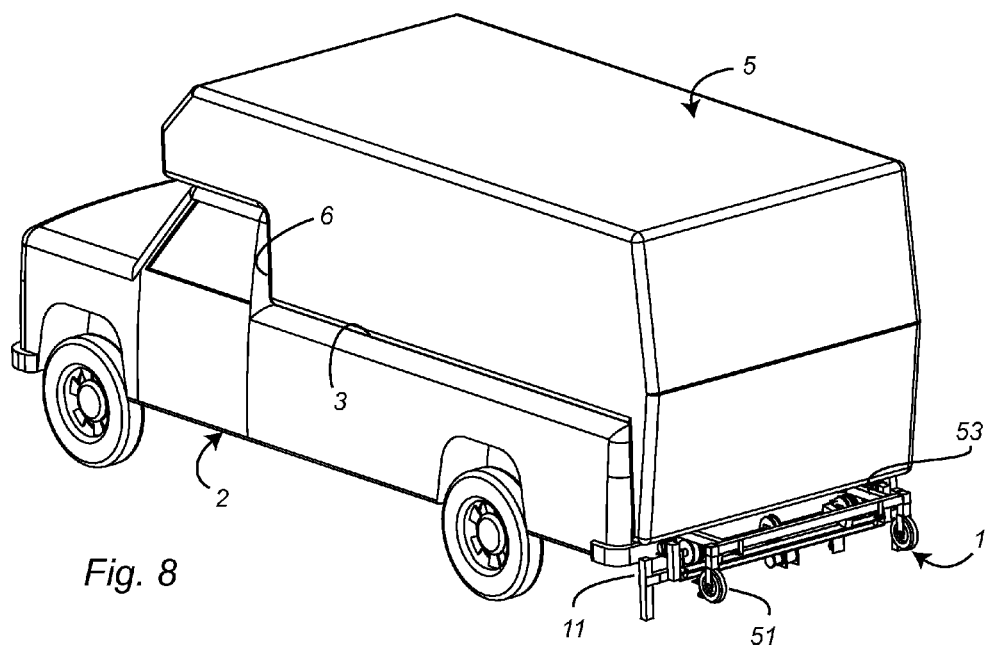
FIG. 8 is the perspective view of FIG. 7 with the hoist assembly and stiff-leg frame disassembled and stowed for travel.

FIGS. 7 and 8 illustrate the camper-insert 5 in receivership on the bed 3. FIG. 7 shows the apparatus 1 at its end-of-loading or beginning-of-unloading configuration. FIG. 8 shows the apparatus 1 in its travel configuration with the distal ends 12 of the vertical members 11, the struts 21, the foot 29 and the telescoping beams 24 disassembled and stowed in interstitial spaces on the truck. The camper-insert 5 is resting on the side rails 53 in its nested position on the floor of the bed 3. In the preferred embodiment, the side rails 53 are 1.5 inches in height and define a minimal vertical offset to the load. The offset is minimally sufficient, also, to channel the cables. Since the side rails 53 are attached to the camper-insert for most of the length, the bending moment of the 1.5 inch gauge is restricted to the relatively small extension at the tail; therefore, a relatively narrow gauge is justified. The offset would have been a minimum of 3.5 inches if the sheaves 59 were configured beneath the camper instead of on the hoist assembly.

Figure 11:
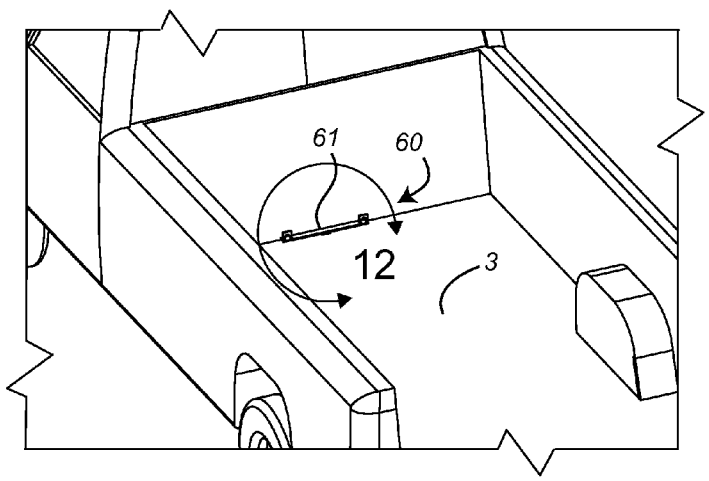
FIG. 11 is a partial perspective view of the truck bed showing the lief spring.
Figure 12:
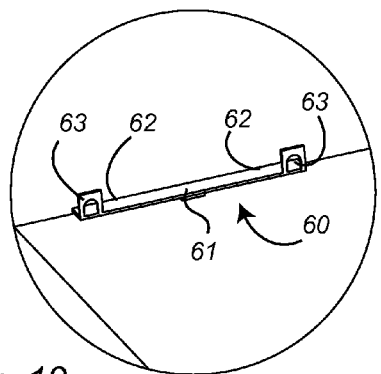

The front 6 of the camper-insert 5 is held down for travel purposes by a means for holding 60. The means for holding 60 can be any cable, rope, guy or bracket attached between the bed and the camper. In the preferred embodiment, the means for holding 60 is comprised of a lief spring 61 mounted onto the bed at the bulkhead position, as shown in FIGS. 11 and 12. The attachment point is the center of lief spring 61, which leaves lateral arms 62 thereof free to flex. The lateral arms 62 have bores 63 therein positioned at the ends to receive bosses 64 extending forwardly from the head rail 48 (FIG. 13). The flexibility of the lateral arms 62 allows the camper-insert 5 to roll, and to some degree pitch, independently from the truck body. In this way, the vehicle's suspension system is augmented. In the preferred embodiment, the lief spring 61 is 3 to 4 inches wide and defines the lateral offset for the load. The offset also prevents the front 6 from jostling against the bulkhead of the truck during travel and replaces space that might otherwise be taken up with a "headache rack". The pallet 50 may be used to support any large-volume load 8 in the operation of the apparatus for loading 1 without the camper-insert 5; but, in such a case, the gauge of the side rails would need to be increased accordingly.

The apparatus for loading 1 can be fabricated from two inch, or greater, metal tubing or channel, the exception being the side rails 53 at 1.5 inches. Steel is preferred, particularly for the side rails, for strength reasons. Hinged and telescoping assemblies can be pinned for easy disassembly, and multiple pin holes can be added on telescoping parts for adjustability. Bushings may also be added to telescoping parts for smooth operation. Non-hinged, or non-telescoping, joints are preferably welded. The stiff-leg frame 10 is preferably rated for a four thousand pound payload. The foot 29 may be contoured on the leading edge to facilitate sliding. Wire cable is dangerous because of whip-lash in the event of fracture. Also, wire strands tend to become frayed when traversing sheaves and the needle-like broken ends present a handling hazard. In the preferred embodiment, low-elongation synthetic rope is preferred for the first cable 33 and the second cable 43. Twisted rope comprised of Dacron® fiber is a suitable choice for a low-stretch option. Elasticized shock cord, or rubber surgical tubing, can be used to gather slack rope, or otherwise keep running sections in the correct circuits. Such components as sheaves, wheels, rollers and winches are commercially available as stock items, in most cases. The synthetic rope and the winches should be rated, at minimum, for a two thousand pound pull.

It is to be understood that the invention is not limited in its application to the details of construction and to the arrangements of the components set forth in the preceding description or illustrated in the drawings. For example, a three or four to one purchase can be used for mechanical leverage in the first cable circuit 35. Also, it is to be understood that the phraseology and terminology employed herein are for the purpose of the description and should not be regarded as limiting.

What is claimed is:

1. An apparatus for loading a camper-insert onto a truck having a bed with an open end, comprising:
   a stiff-leg frame for lifting and supporting the camper-insert from a ground surface immediately adjacent the open end, the stiff-leg frame comprised of at least two vertical members joined substantially at the proximal ends thereof by a crossbar member, the distal ends thereof resting on the ground surface, the crossbar member positioned at substantially the elevation of the bed, the stiff-leg frame horizontally stabilized by at least one connector hinge attached between the stiff-leg frame and the open end;
   a foot resting on the ground surface medially beneath the camper-insert when the camper-insert is in position for loading, said foot braced against the stiff-leg frame;
   at least one telescoping beam pivotally connected at its distal end to the rear of the camper-insert and pivotally connected at its proximal end to the foot, said telescoping beam swinging in a vertical arc about its proximal end and collapsing to a minimum radius of curvature equal to the height of the bed, the minimum radius of curvature coinciding with the center of gravity of the load shifting forward of the stiff-leg frame; and a means for drawing the camper-insert over the stiff-leg frame and into the bed;

whereas, the front and rear of the camper-insert are sequentially lifted up and over the stiff-leg frame by the means for drawing and the at least one telescoping beam braced against the stiff-leg frame, the weight of the camper-insert is substantially supported by the stiff-leg frame and not by the open end, the horizontal thrust from cantilevering the camper-insert over the frame is transferred to the truck through the at least one connector hinge, and the camper-insert settles onto the truck bed with minimal offset to mating surfaces.

2. The apparatus of claim 1, wherein the means for drawing comprises a first winch and cable system.

3. The apparatus of claim 2, wherein the foot is braced by two struts in a V configuration with the vertex located at the foot.

4. The apparatus of claim 3, wherein the at least one telescoping beam is two telescoping beams in a V-configuration with the vertex located at the foot.

5. The apparatus of claim 4, wherein the first winch and cable system comprises a first winch fixed to the stiff-leg frame, said first winch winding a first cable to effectively draw the camper-insert forward from a rear attachment point.

6. The apparatus of claim 5, wherein the drawing of the camper-insert is mechanically-leveraged by doubling purchase to reduce required winch power.

7. The apparatus of claim 5, wherein respective horizontal thrusts of the first winch and the two struts acting on the stiff-leg frame are co-planar, such that forces acting in a force couple are precluded.

8. The apparatus of claim 7, further comprising a hoist assembly, said hoist assembly including the two struts and the two telescoping beams, wherein said struts are hingingly attached at distal ends thereof to the foot, said hoist assembly configured to raise the front of the camper and position proximal ends of the two struts substantially at the elevation of the cross bar when drawn upon by the first winch and cable system, said hoist assembly capable of partial disassembly for stowage and transport purposes.

9. The apparatus of claim 1, further comprising a pallet attached to and traveling with the camper, the pallet extending at least one wheel rearwardly to eliminate dragging friction over the ground surface, the pallet providing minimal clearance for the means for drawing while contributing minimal offset.

10. The apparatus of claim 8, further comprising a means for withdrawing the camper-insert over the stiff-leg frame and out of the bed.

11. The apparatus of claim 10, wherein the means for withdrawing the camper-insert comprises a second winch and cable system.

12. The apparatus of claim 11, wherein the second winch and cable system comprises a second winch fixed to the stiff-leg frame, said second winch winding a second cable to effectively draw the camper-insert rearward from a front attachment point.

13. The apparatus of claim 12, wherein the first and second winches act cooperatively in withdrawing the camper-insert, the first winch providing a braking force when the center of gravity tips.

14. The apparatus of claim 12, wherein the first and second cables change direction around sheaves placed in appropriate locations on the stiff-leg frame and the hoist assembly.

15. The apparatus of claim 12, wherein the first and second cables are synthetic ropes having minimal stretch, said ropes avoiding the fraying and splitting common to wire cables and the safety hazards thereby presented.

16. The apparatus of claim 10, further comprising a means for holding down the camper-insert in the loaded position, said means for holding allowing separate articulation of the camper-insert and the truck bed under road conditions.

17. The apparatus of claim 16, wherein the means for holding comprises a lief spring attached at its center to the bed in a forward position thereto, the lief spring having lateral arms free to flex with bores therein to receive two bosses extending forwardly from the pallet, one at each end of the lief spring, the lateral arms flexing against inertial torque forces.

18. An apparatus for loading a large-volume load onto a truck having a bed with an open end, comprising:

a stiff-leg frame for lifting and supporting the large-volume load from a ground surface immediately adjacent the open end, the stiff-leg frame comprised of at least two vertical members joined substantially at the proximal ends thereof by a crossbar member, the distal ends thereof resting on the ground surface, the crossbar member positioned at substantially the elevation of the bed, the stiff-leg frame horizontally stabilized by at least one connector hinge attached between the stiff-leg frame and the open end;

a foot resting on the ground surface medially beneath the large-volume load when the large-volume load is in position for loading, said foot braced against the stiff-leg frame;

at least one telescoping beam pivotally connected at its distal end to the rear of the large-volume load and pivotally connected at its proximal end to the foot, said telescoping beam swinging in a vertical arc about its proximal end and collapsing to a minimum radius of curvature equal to the height of the bed, the minimum radius of curvature coinciding with the center of gravity of the load shifting forward of the stiff-leg frame; and a means for drawing the large-volume load over the frame and into the bed; whereas, the front and rear of the large-volume load are sequentially lifted up and over the stiff-leg frame by the means for drawing and the at least one telescoping beam braced against the stiff-leg frame, the weight of the large-volume load is substantially supported by the stiff-leg frame and not by the open end, the horizontal thrust from cantilevering the large-volume load over the frame is transferred to the truck through the at least one connector hinge, and the large-volume load settles onto the truck bed with minimal offset to mating surfaces.

* * * * *